US012696848B2

(12) United States Patent
Van Dijk et al.

(10) Patent No.: US 12,696,848 B2
(45) Date of Patent: Aug. 4, 2026

(54) COMPRESSED EXPANDABLE FLORAL ARRANGEMENT MECHANICS AND METHODS

(71) Applicant: VANTHUS TECHNOLOGIES, LLC, Sudbury, MA (US)

(72) Inventors: Juan Carlos Van Dijk, Sudbury, MA (US); Kirsten Van Dijk, Sudbury, MA (US)

(73) Assignee: VANTHUS TECHNOLOGIES, LLC, Sudbury, MA (US)

( * ) Notice: Subject to any disclaimer, the term of this patent is extended or adjusted under 35 U.S.C. 154(b) by 124 days.

(21) Appl. No.: 17/889,610

(22) Filed: Aug. 17, 2022

(65) Prior Publication Data

US 2023/0058364 A1      Feb. 23, 2023

Related U.S. Application Data

(60) Provisional application No. 63/235,186, filed on Aug. 20, 2021.

(51) Int. Cl.
*A01G 5/04*          (2006.01)

(52) U.S. Cl.
CPC ..................................... *A01G 5/04* (2013.01)

(58) Field of Classification Search
CPC ...................................................... A01G 5/04
See application file for complete search history.

(56) References Cited

U.S. PATENT DOCUMENTS

| | | | |
|---|---|---|---|
| 3,375,607 A | | 4/1968 | Melvold |
| 4,941,572 A | * | 7/1990 | Harris .................. A01G 13/262 |
| | | | 53/472 |
| 5,142,820 A | | 9/1992 | Aquino |
| 6,185,863 B1 | | 2/2001 | Tabbert |
| 6,957,512 B2 | | 10/2005 | Bakula et al. |
| 7,260,914 B2 | | 8/2007 | O'Connor |
| D850,322 S | | 6/2019 | Harshman et al. |
| 2003/0087051 A1 | * | 5/2003 | Murray .................. B65B 25/001 |
| | | | 428/178 |
| 2005/0005513 A1 | | 1/2005 | Walton |
| 2005/0097816 A1 | * | 5/2005 | Elder ...................... A01G 20/00 |
| | | | 47/65.8 |
| 2009/0236035 A1 | * | 9/2009 | Wimer .................. A01G 24/60 |
| | | | 156/242 |
| 2019/0045731 A1 | * | 2/2019 | Dixon .................... A01G 31/02 |

(Continued)

FOREIGN PATENT DOCUMENTS

| | | |
|---|---|---|
| DE | 3546405 A1 | 7/1987 |
| EP | 1162222 A2 | 12/2001 |
| EP | 1868470 B1 | 2/2014 |

(Continued)

OTHER PUBLICATIONS

Oshun Pouch, website Dec. 20, 2021.

*Primary Examiner* — Jessica B Wong
(74) *Attorney, Agent, or Firm* — AKC PATENTS, LLC; Aliki K. Collins

(57) ABSTRACT

A floral arrangement product includes a pouch comprising a membrane, and an expandable medium in a compressed state contained within the pouch. The expandable medium expands upon hydration and fills the pouch, and the membrane has an interface for inserting plants and/or flower stems into the expandable medium.

11 Claims, 15 Drawing Sheets

100

100

(56)         References Cited

U.S. PATENT DOCUMENTS

2021/0378186 A1* 12/2021 Hoff ........................ A01G 24/50

FOREIGN PATENT DOCUMENTS

| | | |
|---|---|---|
| WO | WO2011139756 A1 | 11/2011 |
| WO | WO2019044726 A1 | 3/2019 |
| WO | WO2021050501 A1 | 3/2021 |
| WO | WO2021236432 A1 | 11/2021 |

* cited by examiner

*100* membrane
102 pouch
101 fill
103

Heat Seal
105 perforations
104

*100*

102

103

101

104

*200*

*300*

400

405   402   403

406

404

401

407

409   411

408

410

COMPRESSED EXPANDABLE FLORAL ARRANGEMENT MECHANICS AND METHODS

CROSS REFERENCE TO RELATED CO-PENDING APPLICATIONS

This application claims the benefit of U.S. provisional application Ser. No. 63/235,186 filed on Aug. 20, 2021 and entitled FLORAL ARRANGEMENT MECHANICS AND METHODS, which is commonly assigned and the contents of which are expressly incorporated herein by reference.

FIELD OF THE INVENTION

The present invention relates to floral arrangement mechanics and methods and more particularly, to floral arrangement mechanics and methods that utilize expandable components.

BACKGROUND OF THE INVENTION

Floral arrangement mechanics are used for the support of cut flowers and other plant and ornamental stems for the purposes of crafting, transporting and displaying floral arrangements in a way that they are maintained in good condition for a prolonged period of time, depending on the surrounding conditions. The preferred mechanics known in the art are low cost, easy to adapt to generic and custom containers, have fast water saturation and low drainage or evaporation. The existing mechanics have the proper geometry and combination of rigidity and friability to allow easy insertion of more delicate flower stems without affecting the quality of the cut stem or deforming the insertion area. The resultant interface holds the stem in place while promoting the absorption of water and nutrients. The current methods and mechanics utilize components manufactured mostly using non-renewable resources, such as petrochemical derived plastics and compounds. These petrochemical derived plastics and compounds are in some cases toxic or even carcinogenic, and are slow to biodegrade once they are disposed of under normal conditions.

There exist several popular methods to support flower arrangements and to organize or guide stems into a vessel, including specialized containers and accessories designed for a plurality of special purposes. By far the most widespread mechanic used in floral arrangements are phenolic thermosets and hard rigid polyurethane foams. These foams are commonly used in events such as weddings and funerals, public displays, personal floral deliveries, floral design exhibitions and art installations. Since their discovery in the 1950's these foams have been the method of choice and their composition and applications have iterated and evolved with many enhancements and derivative products. Notwithstanding improvements in composition, some floral foams continue to be phenol/formaldehyde based, with potential health hazards and environmental problems since both phenol and formaldehyde are toxic chemicals and formaldehyde is listed as a carcinogen by the National Toxicology Program (NTP) and, for example, must be labeled in the State of California as "known to the State of California to cause cancer".

Attempts have been made at developing a low index polyurethane foam that is at least partially biodegradable by including non-petrochemical components, but they have not succeeded in completely replacing components such as di- or poly-isocyanates and polyether or polyester polyols. And most resulting, improved products are not able to be made economically or meet criteria required to deem products to be biodegradable, degradable or compostable in a reasonable time or leaving only benign by-products. Some flexible biodegradable thermoplastic materials have been developed; however rigid biodegradable thermoset materials are not widely available.

Public attention has recently been directed toward environmental pollution and there has been much speculation and confusion about the definitions of degradability.

A degradable material is one that undergoes a significant change in its chemical structure, whether or not by action of a naturally occurring microorganism.

A biodegradable material will degrade by the action of a naturally occurring microorganism but may leave toxic residues.

A "compostable material" is capable of undergoing biological decomposition in a compost site and it breaks down into inorganic compounds and biomass at a rate consistent with known compostable materials (like cellulose).

A "home compostable material" does not require the special composting conditions present only at specialized municipal facilities National (ASTM) and International (ISO) standard agencies have developed various degradability and composability tests and metrics that are used in the industry but can be confusing and mis-lead consumers. As an example, quoting that a product "has been shown by ASTM D5511 to biodegrade 51.5% within 365 days in biologically active landfill conditions" can be misleading since a) ASTM D5511 is a test methodology that has no pass/fail criteria for biodegradability and b) A "biologically active landfill conditions" described in the test requires anaerobic biodegradation under controlled composting conditions which may only be found at specialized municipal facilities; while many arrangements—mechanics included—make their way into regular landfills where they add to the bulk and toxic leachate and home composts and deteriorate the soil. As a result, there are legislations being proposed that limit the use of non-compostable arrangements. For example, in Europe, some cemeteries are requiring that all floral arrangements left on the grounds be 100% compostable.

Additional concerns have been raised recently about the impact micro-plastics have on marine eco-systems. Floral foam particles are commonly poured down the drain and make their way into bodies of water. Studies at RMIT have found that plastic foam, which is prone to break into tiny pieces as it is cut, crushed or slowly degraded, can be ingested by a range of freshwater and marine animals and affect their health. The RMIT study showed the floral foam micro-plastics also leach chemicals into the surrounding water and in their tests were more toxic to aquatic invertebrates than leachates from other plastic families.

In addition to improvements to foam based solutions there have been materials and techniques promoted to avoid the use of foams. These may make use of natural or reusable components in arrangements, such as moss, floral frogs, sand, chicken wire and water tubes. Many of these still utilize non-renewable plastics or metals which would be best to separate and reuse rather than disposed of together with the flowers. However, such separation and return of reusable components is time consuming and impractical since the client, the florist or the artist is not usually present at the dismantling of an arrangement.

Accordingly, there is still a need for alternatives to floral foam that meets the various functional requirements for floral arrangements while providing a natural, petro-chemical free, non-toxic and home compostable solution. There is also a need to replace existing methods and products with a natural and renewable alternative that minimizes detrimental impact to health and the environment and, after disposal, regenerates into humus material that supports plant growth and is void of toxic or non-biodegradable by-products.

SUMMARY OF THE INVENTION

The invention provides a novel floral arrangement mechanic which comprises a stem support medium which is delivered in compressed form inside a container which is partially or fully constructed from a membrane through which plant and flower stems can be easily inserted. Supplying the medium in compressed form minimizes transport and storage expenses. When the medium is hydrated at the point of use, it reaches a density that optimally supports plant and flower stems in their arranged position while providing nutrients to extend their longevity. Tightening of the membrane during medium expansion makes it easier for flower stems to be inserted through the membrane and into or through the support medium. The membrane is semipermeable, pre-perforated, or perforable (suitable to be perforated prior to use) to allow hydration while minimizing evaporation and drying out of the medium during use. The membrane attains a dome shape which is an ideal form for a typical radial floral arrangement. In one embodiment of the invention, all components of the mechanic are manufactured from non-petrochemical sources that are fully biodegradable in home compost environments.

In general, in one aspect the invention provides a floral arrangement product including a pouch comprising a membrane, and an expandable medium in a compressed state contained within the pouch. The expandable medium expands upon hydration and fills the pouch, and the membrane comprises an interface for inserting plants and/or flower stems into the expandable medium.

Implementations of this aspect of the invention may include one or more of the following. The membrane is made of a Poly Lactic Acid (PLA) based polymer. The membrane is made of natural fibers, such as wax paper, or cotton based textiles. The membrane has a thickness in the range of 10 micrometers to 60 micrometers. The membrane has pre-perforated openings, or is a water permeable membrane or is perforable membrane. The pouch includes a top sheet, and a bottom sheet and the top and bottom sheets comprise edges sealed together. The expandable medium comprises materials compressed in pellets, bricks or granules. The expandable medium comprises wood or coir, or combination thereof compressed in pellets, bricks or granules. The expandable medium has an amount calculated by:

$$Vf = Vm * Cr/Em,$$

wherein
Vf=Volume of compressed expandable medium,
Vm=Maximum volume available inside the pouch without stretching the membrane,
Cr=Residual compression coefficient of the membrane,
Em=Vw/Vd, wherein
Vw=wet volume of nominal amount of expandable medium fill once it stops absorbing water,
Vd=dry volume of the nominal amount of expandable medium fill before hydrating with water.

The product may include a plurality of pouches detachably attached to each other and arranged in linear, circular, two-dimensional or three-dimensional chain-like structures.

In general, in another aspect the invention provides a floral arrangement product including a vessel, an expandable medium in a compressed state contained within the vessel and a membrane at least partially enveloping the expandable medium. The membrane has an interface for inserting plants and/or flower stems into the expandable medium, and the compressed expandable medium expands upon hydration.

Implementations of this aspect of the invention may include one or more of the following. The membrane is made of a Poly Lactic Acid (PLA) based polymer. The membrane is made of natural fibers, such as wax paper, or cotton based textiles. The membrane has a thickness in the range of 10 micrometers to 60 micrometers. The membrane has pre-perforated openings, or is a water permeable membrane or is perforable membrane. The pouch includes a top sheet, and a bottom sheet and the top and bottom sheets comprise edges sealed together. The expandable medium comprises materials compressed in pellets, bricks or granules. The expandable medium comprises wood or coir, or combination thereof compressed in pellets, bricks or granules. The vessel is one of a vase, bowl, or tray. The vessel includes sustainable sourced rapidly renewable plant fibers, such as sugarcane fibers, or recycled paper fibers. The membrane covers and seals an opening of vessel. The expandable medium has an amount calculated by:

$$Vf = Vm * Cr/Em,$$

wherein
Vf=Volume of compressed expandable medium,
Vm=Maximum volume available inside the vessel without stretching the membrane,
Cr=Residual compression coefficient of the membrane,
Em=Vw/Vd, wherein
Vw=wet volume of nominal amount of expandable medium fill once it stops absorbing water,
Vd=dry volume of the nominal amount of expandable medium fill before hydrating with water.

In general, in another aspect the invention provides a method for a floral arrangement including the following. First, providing a pouch comprising a membrane and an expandable medium in a compressed state contained within the pouch, and wherein the expandable medium expands upon hydration and fills the pouch. Next, hydrating the compressed expandable medium and causing it to expand, and then inserting plants and/or flower stems into the expandable medium through an interface of the membrane.

In general, in another aspect the invention provides a method for a floral arrangement including the following. First, providing a vessel comprising an opening. Next, adding an expandable medium in a compressed state into the vessel through the opening. Next, enveloping the expandable medium at least partially with a membrane. The membrane comprises an interface for inserting plants and/or flower stems into the expandable medium. Next, hydrating the compressed expandable medium and causing it to expand, and then inserting plants and/or flower stems into the expandable medium through the membrane interface. The membrane may be a pouch that envelops entirely the expandable medium.

The details of one or more embodiments of the invention are set forth in the accompanying drawings and description below. Other features, objects, and advantages of the invention will be apparent from the following description of the preferred embodiments, the drawings and from the claims.

BRIEF DESCRIPTION OF THE DRAWINGS

Referring to the figures, wherein like numerals represent like parts throughout the several views.

DETAILED DESCRIPTION OF THE INVENTION

Figure 1A:
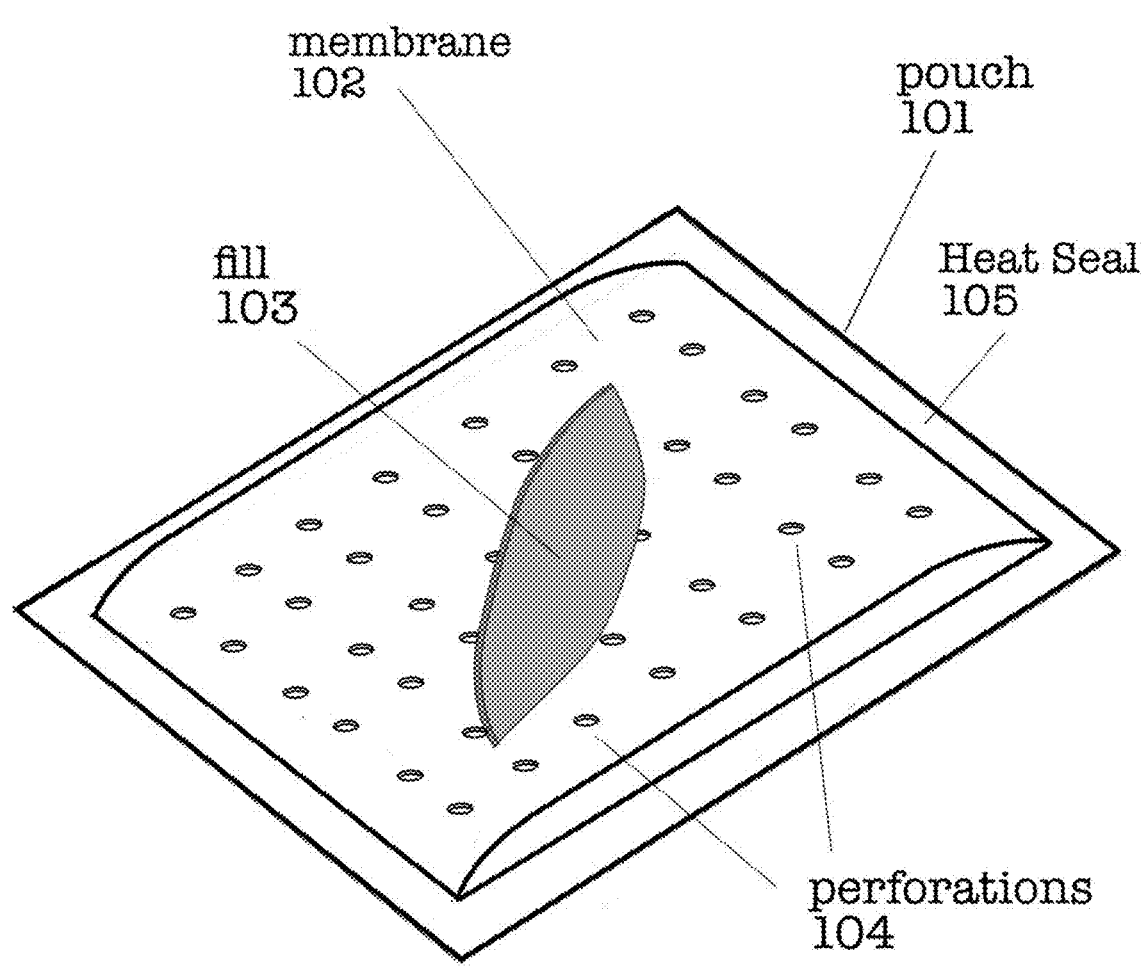
FIG. 1A is a perspective view of a single flower arrangement pouch before hydration, according to this invention.

The present invention relates to a novel floral arrangement mechanic that includes an expandable medium and a membrane which at least partially envelops the medium and provides an interface for plant and flower stems to be inserted into, or through the medium. These basic components can be delivered in several embodiments of the invention, for example by having the membrane form a pouch or by adding the expandable medium into a vessel and then varying the size, shape and arrangement of the vessel to best suit several applications of the invention. The composition of the medium is varied to affect its expansion properties and to enhance its nutrition or hydration properties.

The medium is packaged in the vessel or pouch and delivered to the user in compressed and dry form, thereby reducing the space and expense associated with storage and transportation. The membrane is water permeable, pre-perforated or perforable. During preparation, the vessel or pouch contents are hydrated for a short amount of time, during which the medium expands and the tightened membrane acts to counterbalance expansion, resulting in an optimally rigid mechanic. As the membrane tightens it becomes easier to insert the flower stems with minimal stress or damage to the stems. The rigidity of the medium in expanded form allows the proper support to keep the stems in their desired, arranged position. An added benefit from the current invention is the tendency for the membrane to form a dome shape in its tightened form, which provides an ideal form for plant and flower stems to be inserted so they are radially exhibited in the arrangement. The hydrated medium supplies water and nutrition to the stems, thereby extending their longevity. During use, the membrane further helps to prevent evaporation and excessive drying of the medium.

In one embodiment, the invention provides a petrochemical free alternative mechanic to be used as an alternative to floral foam, thereby reducing the negative effects on health and environment that are associated with the manufacture, transport, use and disposal of the majority of mechanics that are currently available in the art. In order to accomplish this, the raw materials for each component of the embodiments that are described below are selected for their non-petrochemical source, safe use and eco-friendly disposal.

In one example, the membrane is made of Poly Lactic Acid (PLA) based polymers which are polyesters produced by fermentation under controlled conditions of a carbohydrate source like corn starch or sugarcane. These PLA materials are supplied in an ideally thin and penetrable membrane. In other examples, the membrane is made of waxed paper fibers, or cotton based textiles, among others.

The expandable medium is based on natural products which are capable to be compressed to bricks, pellets or granules in order to facilitate transport and deployment. Wood is compressed into pellets in very large quantities worldwide for the use for heating and biomass energy. Wood used in pellet production has the advantage of containing a high natural lignin content which helps bind the compressed materials without the need for any adhesive additives. Environmentally conscious pellet manufacturers use renewable sources of wood. Similarly, the Coconut Coir Pith industry takes advantage of the natural lignin content of coir to compress their product for ease of transport and deployment in agriculture, potting and other industries. Although Peat Moss has very similar compression and beneficial characteristics, it was found to not be a renewable source, since its extraction rate far exceeds its slow re-growth in peatbogs. The products ultimately selected expand with great ease when hydrated and are ideal media to be used in the present invention.

The trays and bowls used in the embodiments below were made from a sustainable sourced, rapidly renewable plant fibers like sugarcane or from 100% recycled paper and fiber content which are produced with minimal ecological impact such as the use of elemental chlorine free (ECF) bleach or eliminating traces of Perfluorosulfonic acids (PFSA) from water resistant coatings.

Figure 1B:
FIG. 1B is a perspective view of the expanded single flower arrangement pouch of FIG. 1A after hydration.
Figure 1B:
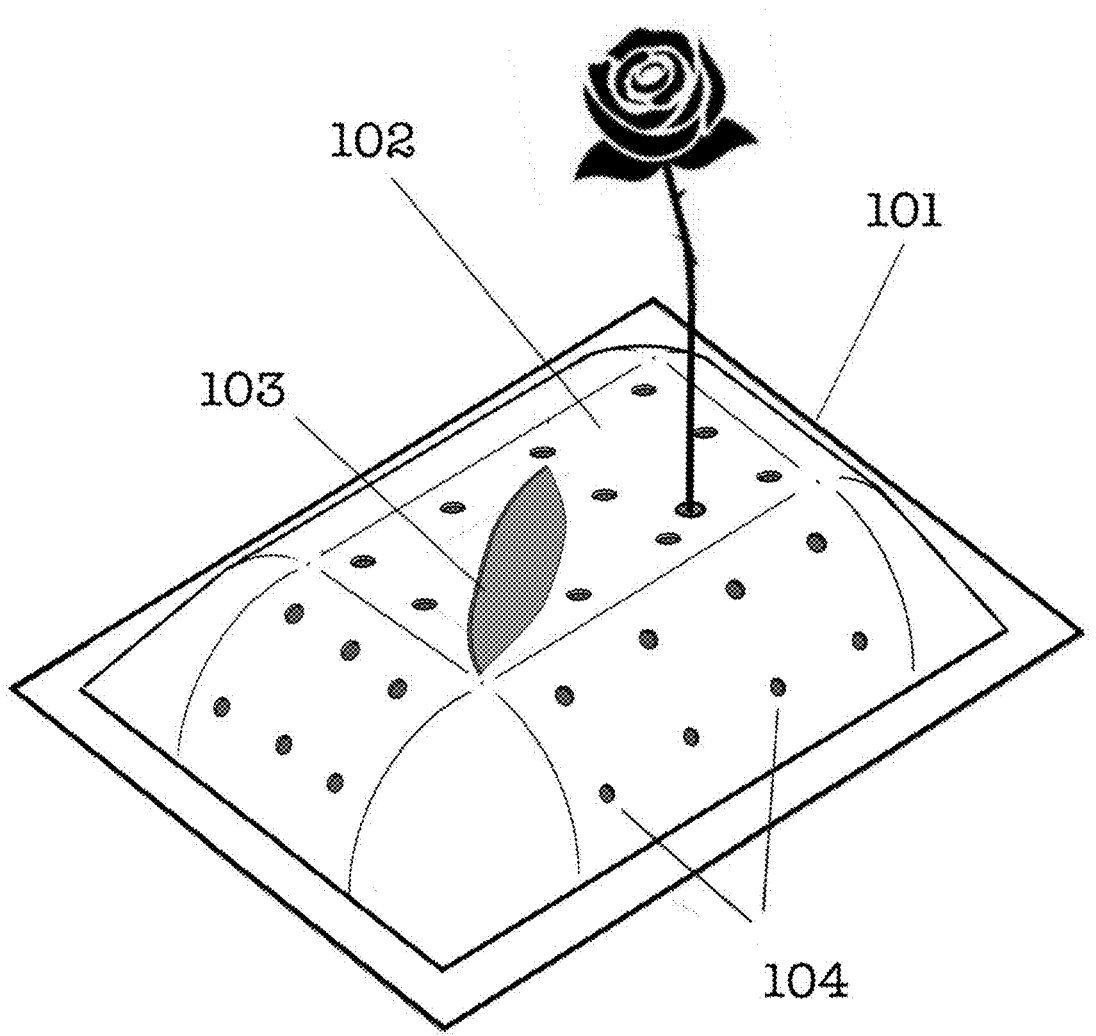

FIG. 1 depicts one of the embodiments of the invention, wherein a pouch 101 is shaped from one or more sheets of membrane 102 for which a home compostable Polylactic Acid (PLA) starch-based bioplastic film was selected. The size of the resultant pouch can vary substantially depending on the flower arrangement needs, with a practical preference for a pouch which is between 20 mm to 500 mm wide and between 20 mm to 500 mm long. In this embodiment the pouch is 140 mm by 200 mm. The practical membrane thickness is in the range of 10 microns to 60 microns, with a preference for 28 microns. The properties of the membrane or alternatively, selective perforation, allow water or other hydrating fluid to reach the interior of the pouch, allow easy penetration by weaker plant stems while optimally containing the medium and preventing excessive evaporation once the mechanic is in use. In the present embodiment the membrane has been pre-perforated with a pattern of holes 104, each between 0.1 mm and 7 mm in diameter (1 mm was preferred for this fill) and spaced between 1 mm and 40 mm apart, with a preference for 25 mm apart. The edges of the membrane sealed at their periphery to form a pouch; which in this embodiment is achieved by using heat sealing apparatus to form a seal 105. Prior to completely sealing all sides, the medium 103 is added to the pouch.

In the present embodiment, coconut coir pith has been selected as the medium and supplied in granular form, with granules up to 10 mm in approximate diameter and between 10 microns and up to 5 mm in thickness. The fill amount is calculated such that, during hydration, the medium's expansion inside the membrane will optimally result in a residual compression which is at once sufficiently rigid to support flower stems in place, and at the same time results in a tightening of the membrane so the stems can be inserted through the membrane and medium with ease and without damaging the stems. In this embodiment, the hydration liquid enters the pouch through the openings 104 and is absorbed by the fill medium 103. In other embodiments, membrane 102 is semipermeable and allows the hydration liquid to diffuse into the pouch where it is then absorbed by the fill medium 103.

An added benefit from the current invention is the tendency for the membrane to form a dome shape in its tightened form, which provides a novel and ideal surface for plant and flower stems to be inserted so they are radially exhibited in the arrangement. In order to optimally reach the benefits outlined by this invention, the medium fill calculations are performed using the formulas below:

$$Vf = Vm * Cr / Em,$$

where
Vf=Volume of compressed medium required in the pouch
Vm=Maximum Volume available inside the container without stretching the membrane
Cr=Residual Compression coefficient
Em=Medium expansion coefficient, where
Where $$Em = Vw / Vd,$$

and
Vw=wet volume of nominal amount of fill once it stops absorbing water
Vd=dry volume of same nominal amount of fill before hydrating.

Since the values of Cr and Em are very dependent on the selection of membrane and fill, these are calculated and optimized for each case and by practical experiment. Practical values of Cr are between 0.9 (fill is not under compression when expanded and membrane is not under tension) and 1.4 (fill is under compression when expanded and membrane is under tension) and values of Em between 1.0 (no fill expansion) and 8.0 (fill expands 8 times its dry volume). In the present embodiment, using compressed granules of coir pith and a 28 micron PLA membrane, the calculated values are Cr=1.0 and Em=4.0. This is suitable for a variety of floral arrangement needs and pouch sizes. In a different embodiment using wood pellets and a 50 micron PLA membrane, the values obtained are Cr=1.05 and Em=2.0.

Once the correct amount is determined, the pouch is filled and sealed. This can be done by any suitable means, and preferably utilizing a heat sealer or existing production machines such as Vertical Form and Fill and Seal (VFFS) equipment.

Figure 2:
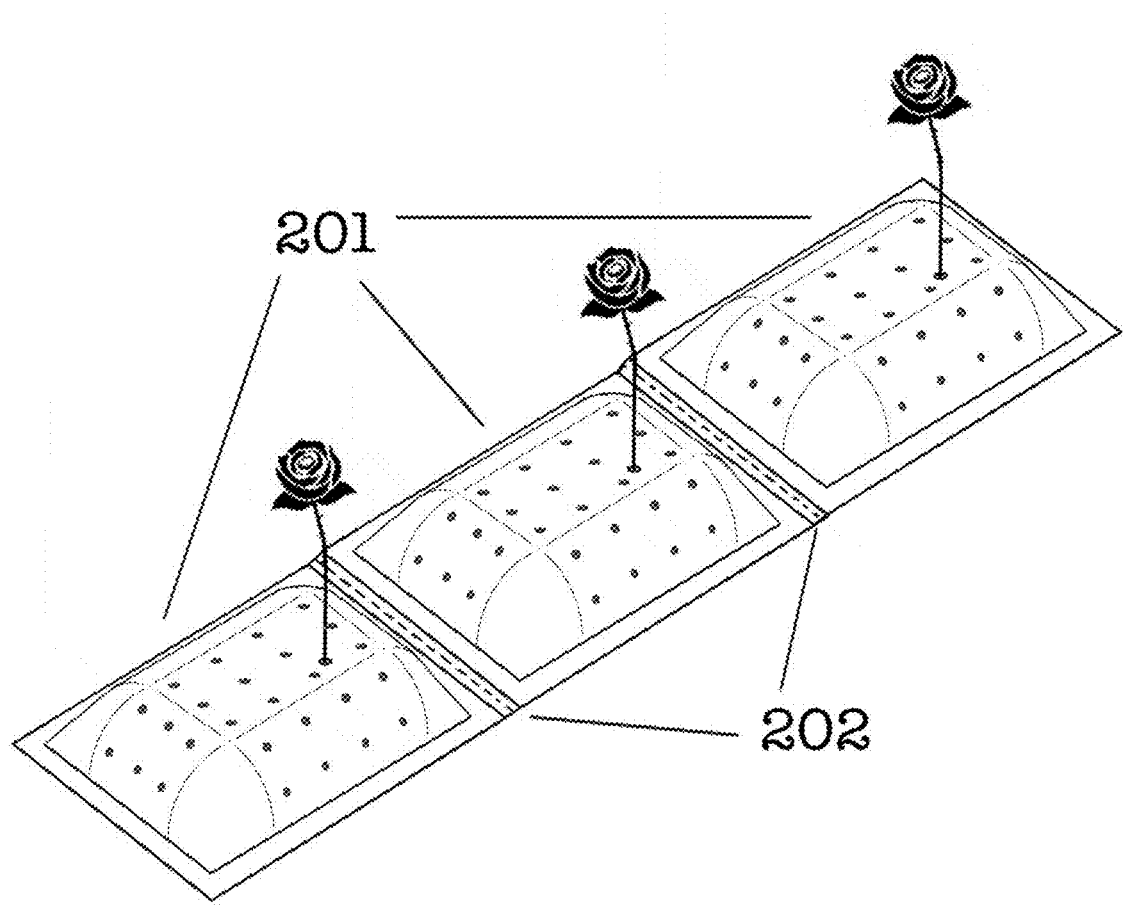
FIG. 2 is a perspective view of a flower arrangement "pouch chain", according to this invention.

In FIG. 2 is shown a Pouch-Chain embodiment of the invention wherein two or more pouches 201 are concatenated to provide a novel delivery of the pouch mechanic. By adding semi-perforations 202 in between the pouches of a chain, one or more pouches can be detached from the rest and used separately. Several pouches can be combined to form interesting and unique shapes, outlines, or constructs; or accommodate floral arrangements for other more traditional shapes like circles, hearts, crosses and others.

Figure 3A:
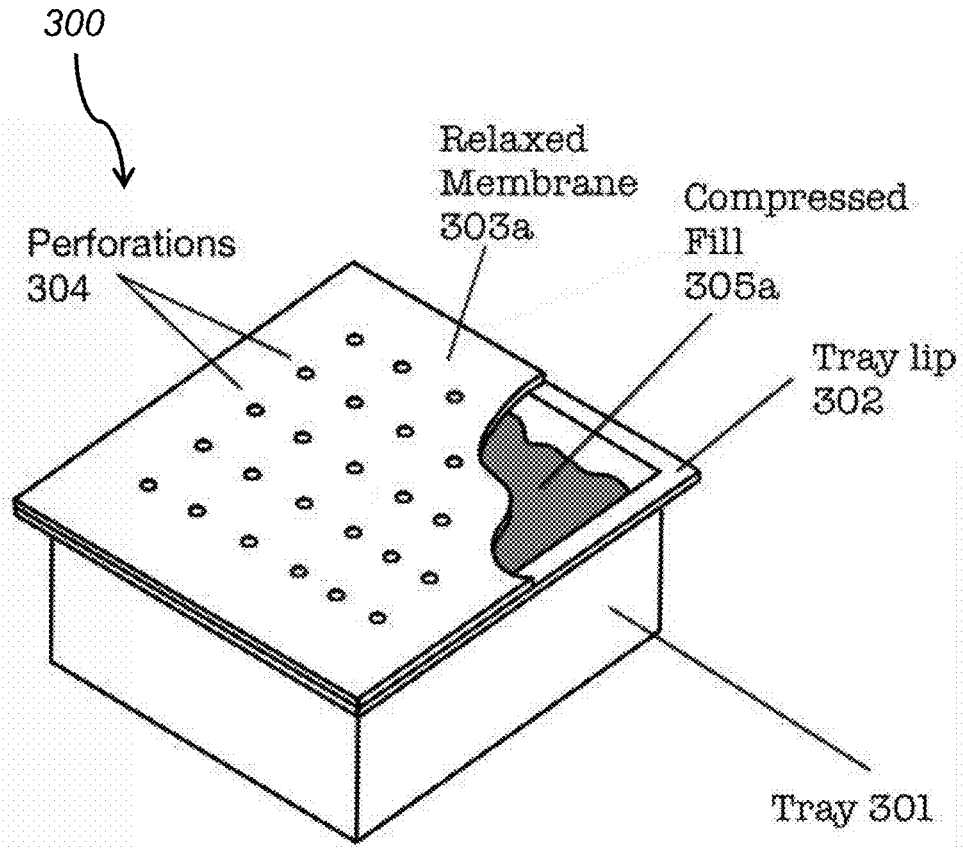
FIG. 3A is a perspective view of a "Ready Made Compote" for flower arrangements, before hydration.
Figure 3B:
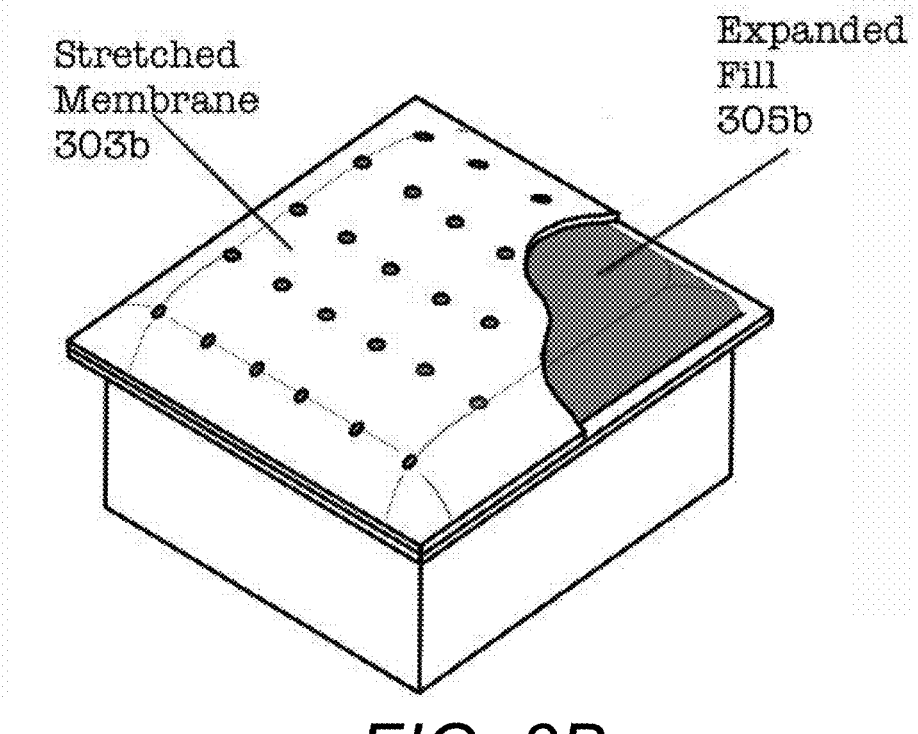
FIG. 3B is a perspective view of the "Ready Made Compote" of FIG. 3A, after hydration.

In FIG. 3a is shown a Ready Made Compote, an embodiment of the present invention wherein a bowl or tray 301 partially contains the medium and acts as a ready-made container for a floral arrangement. In this embodiment, the dry, compressed medium 305a is added to the tray, and the membrane 303a is attached to the tray lip 302 by any suitable means, and preferably using heat sealing apparatus which is readily available for other packaging applications. In FIG. 3b is shown the tray after hydration and expansion of the medium 305b which has caused the membrane 303b to tighten and provide the stem insertion, residual medium compression and dome effect benefits previously described in other embodiments of this invention.

Figure 4A:
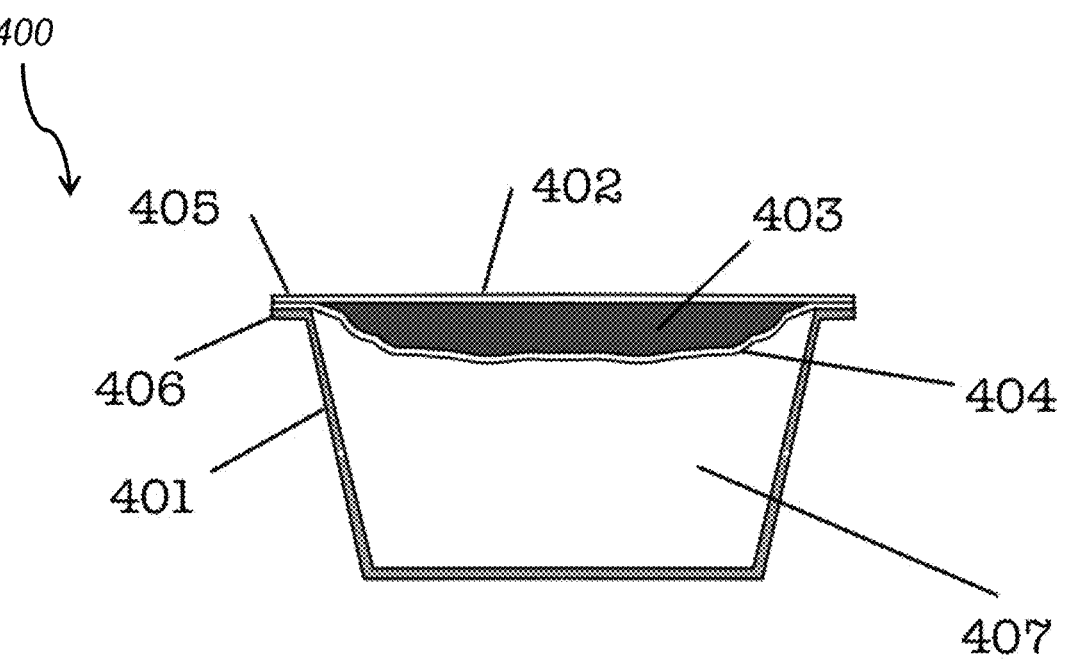
FIG. 4A is a section view of a "Hydrating Compote" for flower arrangements, before hydration.
Figure 4B:
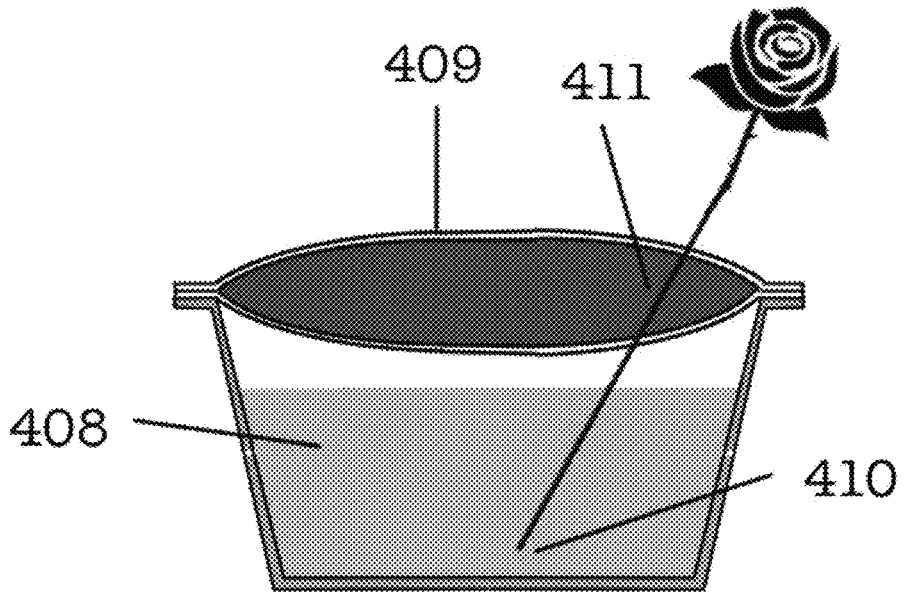
FIG. 4B is a section view of the "Hydrating Compote" of FIG. 4A, after hydration.

In FIG. 4a is shown a Hydrating Compote as an embodiment of the present invention wherein a vessel 401 contains the medium 403 which in this case is used solely as the support for the plant and flower stems, while the space 407 in the vessel below the medium can be filled with water in order to feed the stems. The upper membrane 402 and lower membrane 404 are both permeable, for example by pre-perforation, to allow hydration of the medium and percolation of water into the cavity 407. The medium is contained between the upper and lower membranes and is supplied in dry, compressed form as in other embodiments previously described. The edges of the membranes are sealed to each other and affixed to the rim of the container 406, in the present embodiment by using heat sealing apparatus. FIG. 4B shows the condition once the mechanic is hydrated and the medium expands providing adequate stem support 411. During insertion, the plant and flower stems penetrate the tight upper membrane 409, travel through the support medium 411, through the tight lower membrane and into the water 408. The stems tips 410 are submerged and can draw water directly from the reservoir. This novel design optimally combines some of the benefits of the previously described embodiments while ideally feeding the stems with water and nutrients as may be added during hydration; it allows the container to be transported without spilling and the membranes still serve to provide residual medium compression, as well as a dome effect and help to minimize evaporation of the water during use.

As is the goal of this invention, the above described embodiments result in flower arrangement mechanics that are novel, can be principally sourced from natural, eco-friendly and renewable resources, are efficient to transport and store and provide the necessary functions required for this application.

Figure 5:
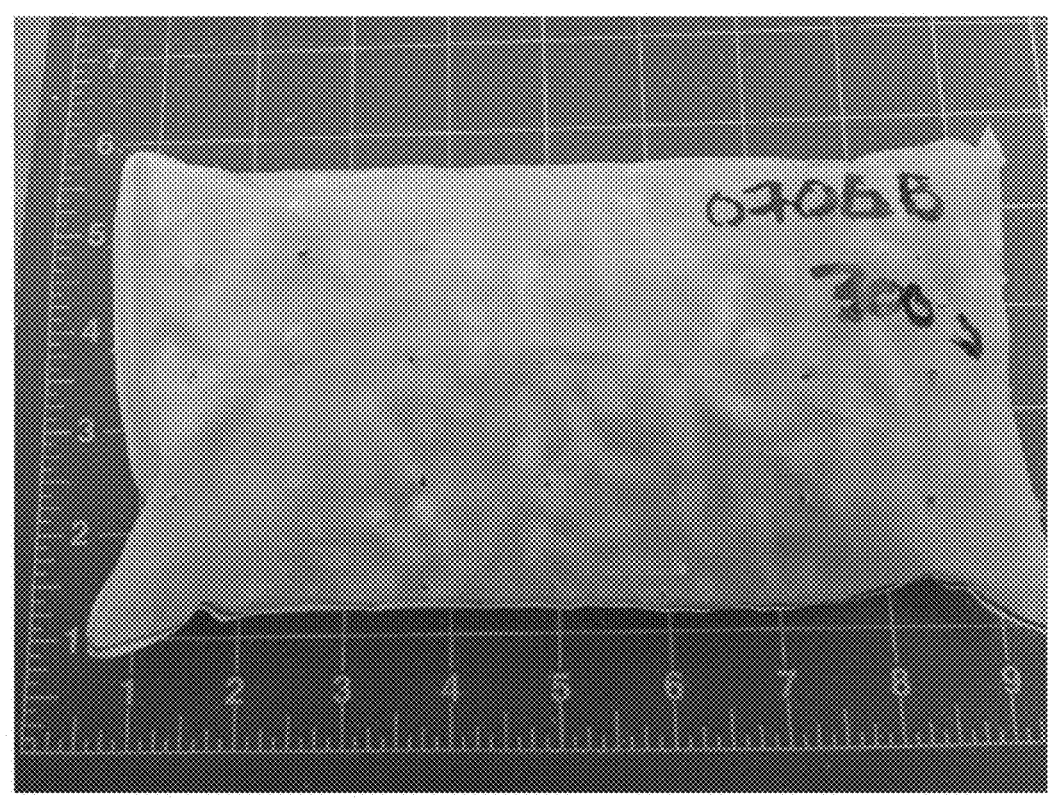
FIG. 5 depicts an example of a flower arrangement pouch filled with dry pellet fill, before hydration.
Figure 6:
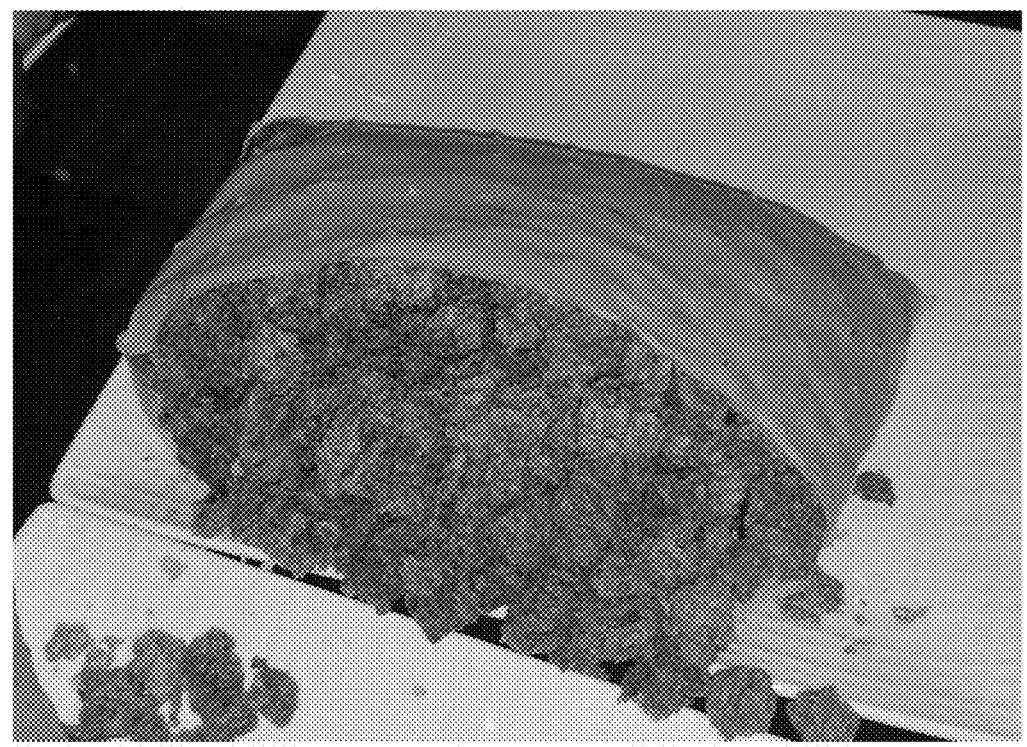
FIG. 6 depicts the cut-through flower arrangement pouch of FIG. 5, after hydration and expansion of the pellet fill material.

In another embodiment the pouch 101 is filled with dry pellet fill 103, as shown in FIG. 5. The membrane is made of a bio-plastic material and it has perforations 104 that have a diameter of 0.5 mm and are 1 inch apart. Upon hydration the dry pellet fill 103 expands, as shown in the cut-through pouch of FIG. 6.

Figure 7A:
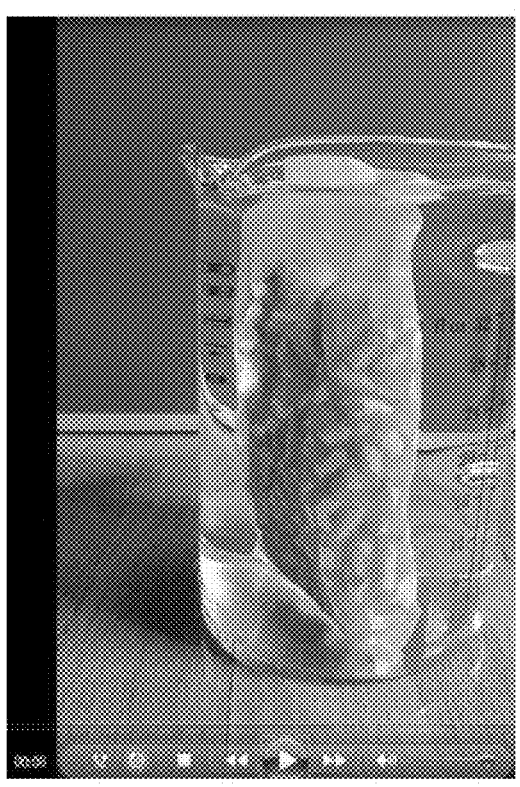
FIG. 7A-FIG. 7C depict the flower arrangement pouch of FIG. 5 at various stages of expansion after hydration.
Figure 7B:
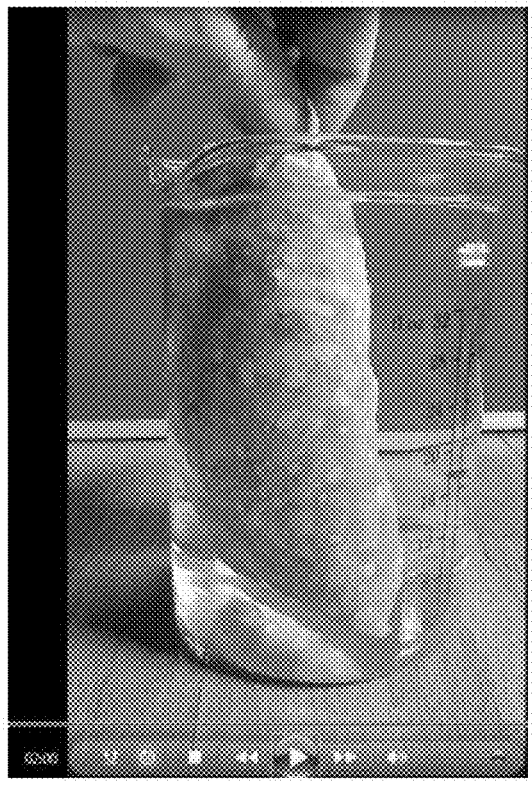
Figure 7C:
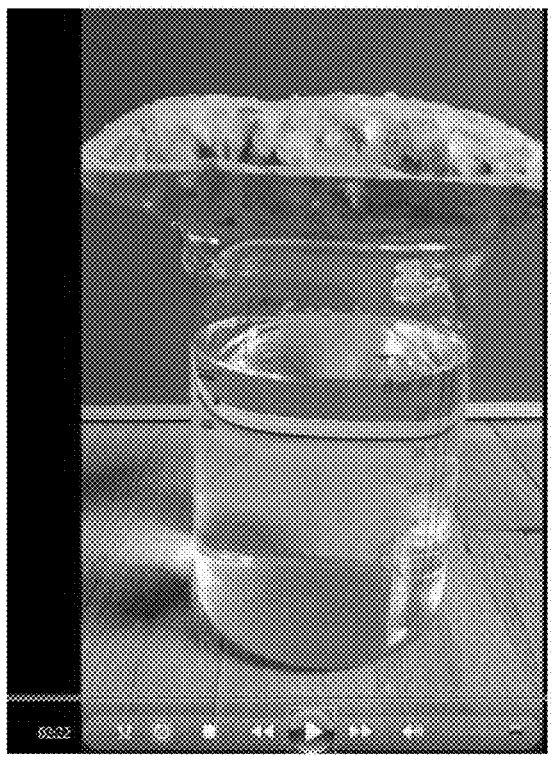

FIG. 7A-FIG. 7C depict the flower arrangement pouch of FIG. 5 at various stages of expansion after hydration. As shown, in the fully hydrated state of FIG. 7C, the membrane achieves a dome shaped outer surface that enhances the stem insertion properties and provides an ideal surface for plant and flower stems to be inserted so they are radially exhibited in the arrangement.

Figure 8:
FIG. 8 depicts decomposition of the membrane of the flower arrangement pouch of FIG. 5, after two weeks.
Figure 9:
FIG. 9 depicts decomposition of the membrane of the flower arrangement pouch of FIG. 5, after three weeks.

FIG. 8 depicts decomposition of the bio-plastic membrane of the flower arrangement pouch of FIG. 5, after two weeks and FIG. 9 depicts decomposition of the membrane of the flower arrangement pouch of FIG. 5, after three weeks.

Figure 10:
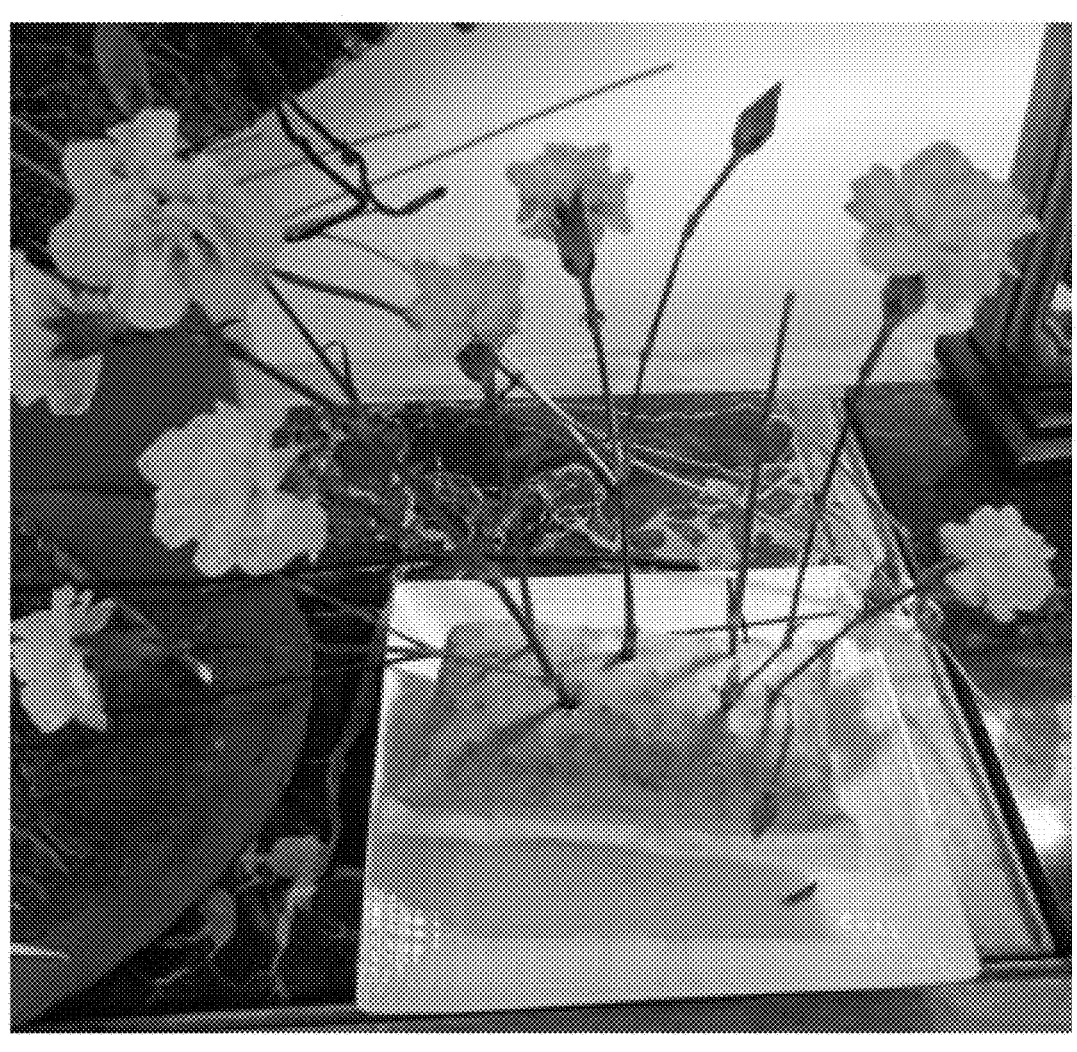
FIG. 10 depicts a flower arrangement pouch of this invention used as a standalone flower arrangement mechanic.
Figure 11:
FIG. 11 depicts a flower arrangement pouch of this invention used as a flower arrangement mechanic inside a container.

FIG. 10 depicts a flower arrangement pouch used as a standalone flower arrangement mechanic and FIG. 11 depicts a flower arrangement pouch used as a flower arrangement mechanic inside a container.

Figure 12:
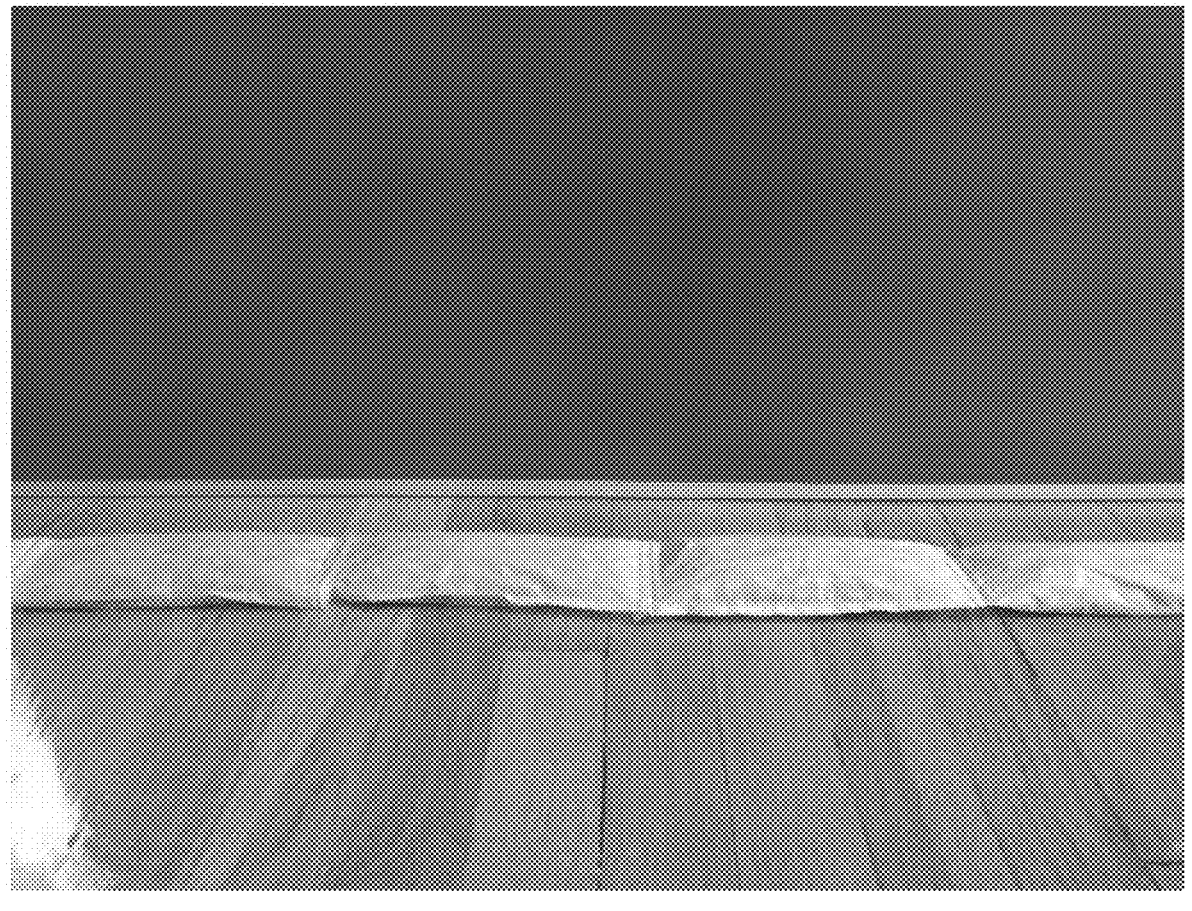
FIG. 12 depicts a set of chained flower arrangement pouches of this invention used for creating novel flower arrangements.
Figure 13:
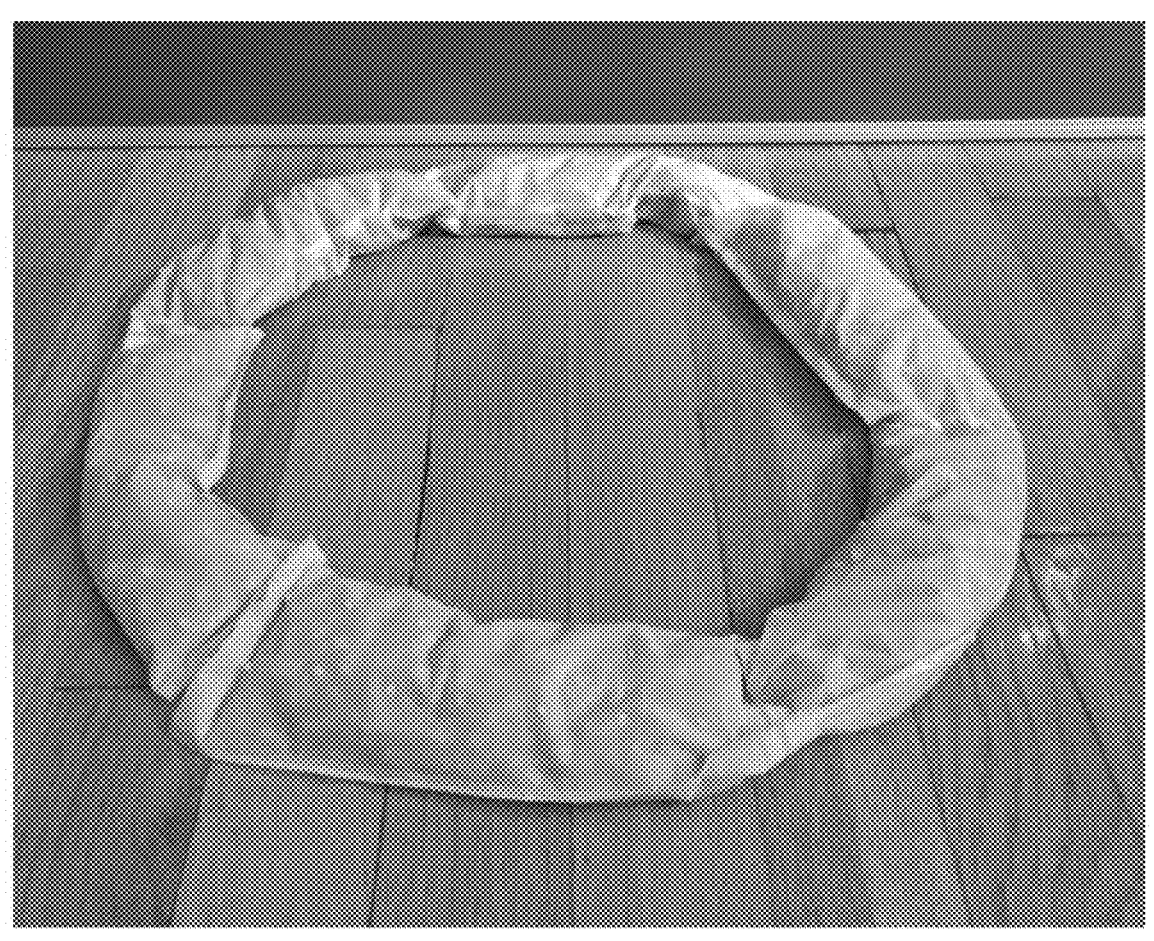
FIG. 13 depicts the set of chained flower arrangement pouches of FIG. 12 used for creating a circular flower arrangement.

FIG. 12 depicts a set of chained flower arrangement pouches of this invention used for creating novel flower arrangements. In one example, the set of chained flower arrangement pouches is used for creating a circular flower arrangement, as shown in FIG. 13.

Figure 14:
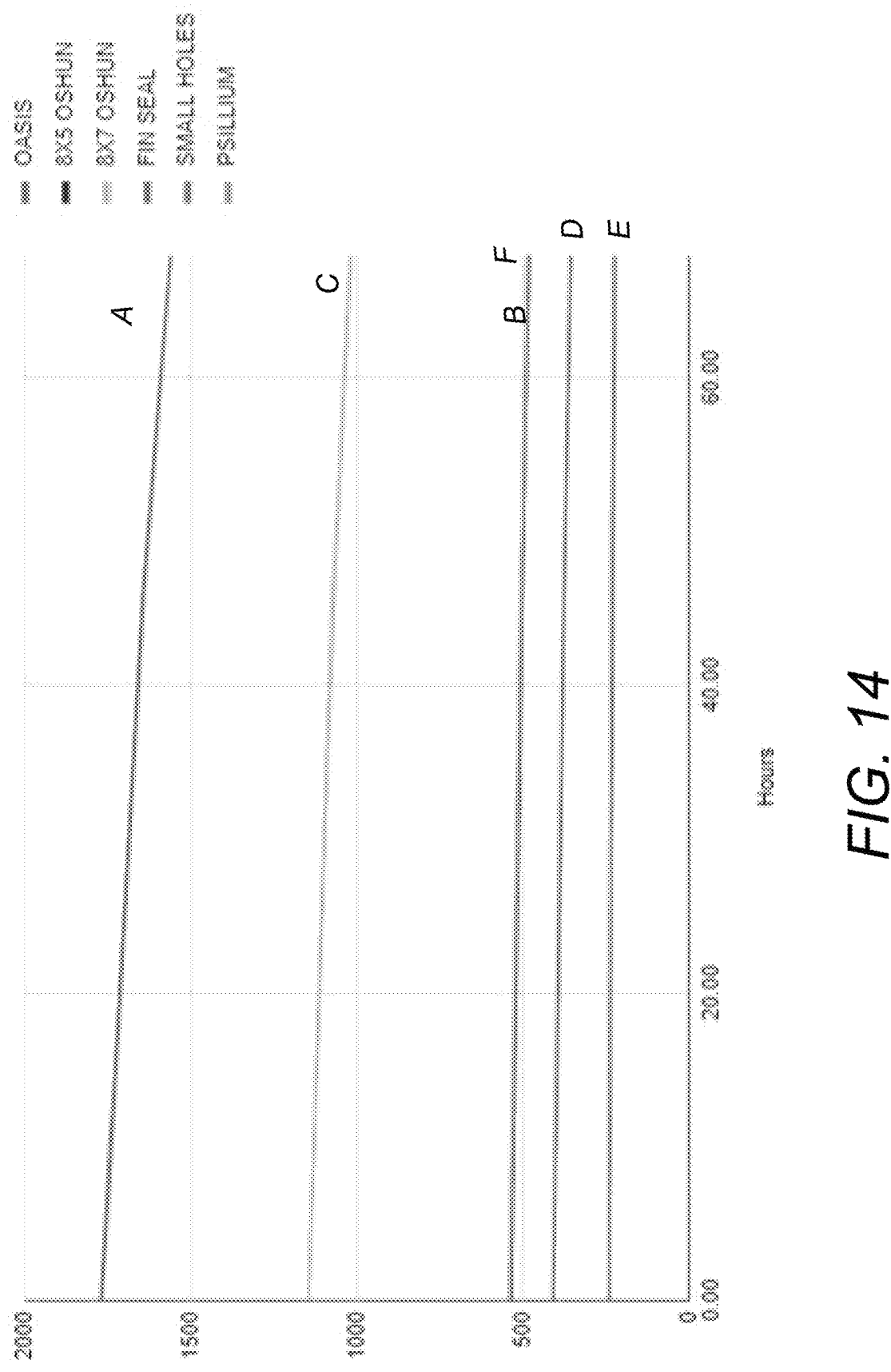
FIG. 14 is a plot of the evaporation rate versus time for different type of membranes used in the flower arrangement pouch of FIG. 1.

FIG. 14 depicts a plot of the evaporation rate versus time for different type of foams or membranes used in the flower arrangement. Examples of the foam and membrane materials shown in FIG. 14 include OASIS® (A), 8×5 OSHUN (B), 8×7 OSHUN (C), FIN SEAL (D), SMALL HOLES (E) and PSILLIUM (F). As shown, the rate of water loss is higher for the state of the art OASIS® (A) floral foam as compared to the membranes used in the present invention.

Figure 15:
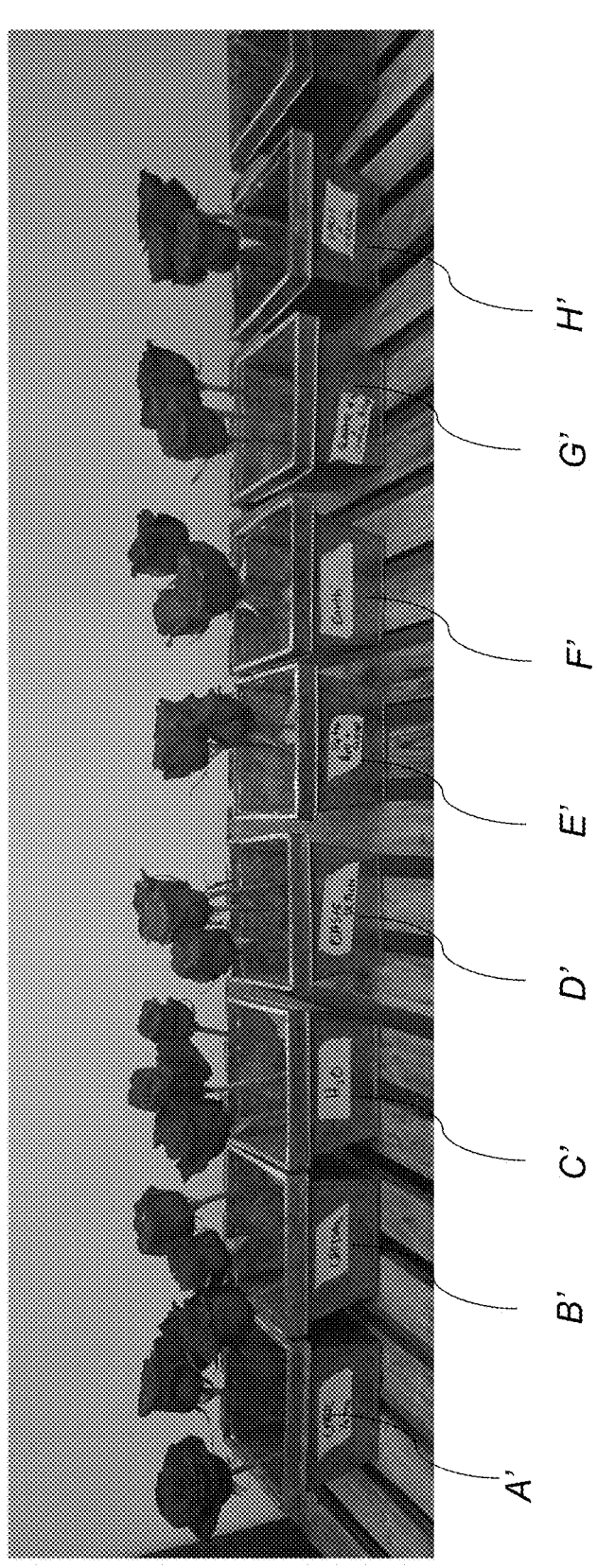
FIG. 15 depicts a longevity test for flower arrangement pouches with different amendments and filler materials compared to existing flower arrangement mechanics.

FIG. 15 depicts a longevity test for flower arrangement pouches with different amendments and filler materials compared to existing flower arrangement mechanics. The amendments and filler materials include Citric acid (A'), Chrysal flower food (B'), water (C'), OASIS® floral foam (D'), water and sugar (E'), Earth (F'), Sugar and Citric acid (G'), OASIS® and Chrysal (H'). As shown, the longevity of the flowers is affected by the choice of the expandable medium and the additives that are supplied.

Figure 16:
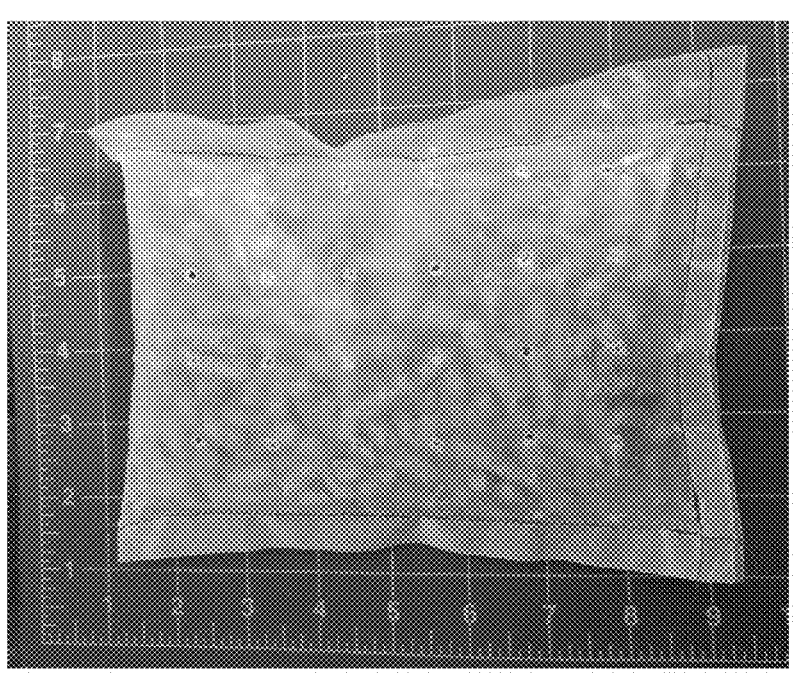
FIG. 16 depicts another embodiment of a flower arrangement pouch of this invention that utilizes a wax paper membrane.
Figure 17:
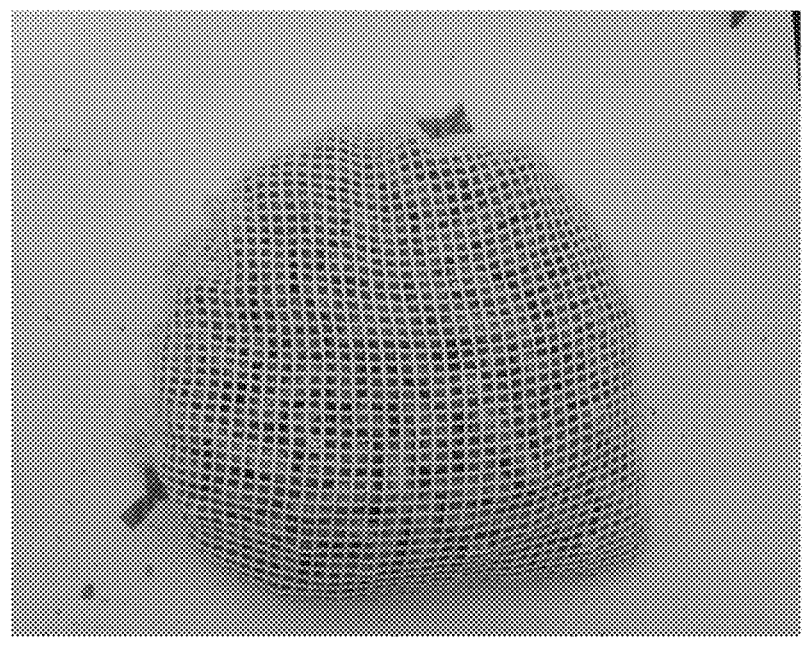
FIG. 17 depicts another embodiment of a flower arrangement pouch of this invention that utilizes a cotton mesh membrane.

FIG. 16 depicts another embodiment of a flower arrangement pouch of this invention that utilizes a wax paper membrane and FIG. 17 depicts another embodiment of a flower arrangement pouch of this invention that utilizes a cotton mesh membrane.

Several embodiments of the present invention have been described. Nevertheless, it will be understood that various modifications may be made without departing from the spirit and scope of the invention. Accordingly, other embodiments are within the scope of the following claims.

What is claimed is:

1. A floral arrangement product comprising:
a pouch comprising two or more sides sealed at their perimeter, wherein at least one of the sides comprises a membrane;
an expandable medium in a compressed state fully enclosed within the pouch, and wherein the expandable medium is configured to expands upon hydration and fills the pouch;
wherein the membrane at least partially envelops the expandable medium and is configured to remain intact and be tightened upon expansion of the expandable medium and to form a rigid dome structure and that is pierceable by plants and/or flower stems;
wherein the expandable medium comprises wood or coir compressed in pellets, bricks or granules and has a fill amount that is sufficient upon expansion of the expandable medium to tighten and keep the membrane intact and to form the rigid dome structure while maintaining a residual compression in the expandable medium, and wherein the combination of the tightened intact membrane and the residual compression of the expanded expandable medium supports and holds the inserted plants and/or flower stems in an arranged position and in any orientation.

2. The product of claim 1, wherein the membrane consists of a Poly Lactic Acid (PLA) based polymer.

3. The product of claim 1, wherein the membrane comprises one of wax paper fibers, or cotton based textiles.

4. The product of claim 1, wherein the membrane comprises a thickness in the range of 10 micrometers to 60 micrometers.

5. The product of claim 1, wherein the membrane comprises pre-perforated openings.

6. The product of claim 1, wherein the membrane comprises a water permeable membrane.

7. The product of claim 1, wherein the membrane comprises a perforable membrane.

8. The product of claim 1, wherein the pouch comprises a top side, and a bottom side and wherein said top and bottom sides are sealed at their perimeter.

9. The product of claim 1, wherein the fill amount of the expandable medium is calculated by:

$$Vf = Vm * Cr / Em,$$

wherein
Vf=Fill volume of compressed expandable medium,
Vm=Maximum volume available inside the pouch without tightening the membrane,
Cr=Residual compression coefficient,
Em=Vw/Vd, wherein
Vw=wet volume of nominal amount of expandable medium fill once it stops absorbing water,
Vd=dry volume of the nominal amount of expandable medium fill before hydrating with water.

10. The product of claim 1, comprising a plurality of pouches detachably attached to each other and arranged in linear, circular, two-dimensional or three-dimensional structures.

11. A method for a floral arrangement comprising:
providing a pouch comprising two or more sides sealed at their perimeter, wherein at least one of the sides comprises a membrane;

providing an expandable medium in a compressed state
fully enclosed within the pouch, and wherein the
expandable medium expands upon hydration and fills
the pouch;

hydrating the compressed expandable medium and caus-
ing it to expand, and wherein the membrane remains
intact and is tightened upon expansion of the expand-
able medium and forms a rigid dome structure that is
pierceable by plants and/or flower stems; and inserting plants and/or flower stems into the expanded
expandable medium through the rigid dome structure of
the membrane; and wherein the expandable medium comprises wood or coir
compressed in pellets, bricks or granules and has a fill
amount that is sufficient upon expansion of the expand-
able medium to tighten and keep the membrane intact
and to form the rigid dome structure while maintaining
a residual compression in the expandable medium, and
wherein the combination of the tightened intact mem-
brane and the residual compression of the expanded
expandable medium supports and holds the inserted
plants and/or flower stems in an arranged position and
in any orientation.

\* \* \* \* \*